US012715298B2

(12) United States Patent
Kimura

(10) Patent No.: US 12,715,298 B2
(45) Date of Patent: Aug. 25, 2026

(54) NOTIFICATION APPARATUS AND VEHICLE

(71) Applicant: ISUZU MOTORS LIMITED, Yokohama (JP)

(72) Inventor: Keisuke Kimura, Yokohama (JP)

(73) Assignee: ISUZU MOTORS LIMITED, Yokohama (JP)

(*) Notice: Subject to any disclaimer, the term of this patent is extended or adjusted under 35 U.S.C. 154(b) by 97 days.

(21) Appl. No.: 18/593,939

(22) Filed: Mar. 3, 2024

(65) Prior Publication Data

US 2024/0300334 A1 Sep. 12, 2024

(30) Foreign Application Priority Data

Mar. 6, 2023 (JP) ................................ 2023-033811

(51) Int. Cl.

*B60L 3/00* (2019.01)
*B60L 58/00* (2019.01)
*B60L 58/27* (2019.01)

(52) U.S. Cl.

CPC ............ *B60L 3/0046* (2013.01); *B60L 58/27* (2019.02); *B60L 2250/16* (2013.01)

(58) Field of Classification Search

CPC ..... B60L 3/0046; B60L 58/27; B60L 2250/16
See application file for complete search history.

(56) References Cited

U.S. PATENT DOCUMENTS

| | | | | |
|---|---|---|---|---|
| 2018/0345816 | A1* | 12/2018 | Sakakibara | B60Q 9/00 |
| 2020/0269719 | A1* | 8/2020 | Aykol | B60L 53/30 |
| 2021/0221250 | A1* | 7/2021 | Hiratsuka | B60L 53/16 |
| 2023/0029384 | A1* | 1/2023 | Zhao | H01M 10/663 |

FOREIGN PATENT DOCUMENTS

| | | | |
|---|---|---|---|
| JP | 2003209901 | A | 7/2003 |
| JP | 2005-295668 | | 10/2005 |
| JP | 2018113799 | A | 7/2018 |
| JP | 2018207683 | A | 12/2018 |

* cited by examiner

*Primary Examiner* — Aaron G Cain

(74) *Attorney, Agent, or Firm* — The Roy Gross Law Firm, LLC; Roy D. Gross

(57) ABSTRACT

A notification apparatus includes a determination section that determines whether a position of a vehicle that includes a battery and a heater that beats the battery is in a low-temperature environment, and a notification section that sends a notification for encouraging charging the battery depending on a result of determination of the determination section.

3 Claims, 8 Drawing Sheets

Imb

| VEHICLE ID: AX2263-0033 | NOTIFICATION INFORMATION |
|---|---|
| 2023/01/25 04:03:54 | TRAVEL STARTS |
| 2023/01/25 07:35:20 | CHARGING STARTS |
| ... | ... |
| 2023/01/25 18:15:06 | VEHICLE STOPS IN LOW-TEMPERATURE ENVIRONMENT (PLEASE CONNECT CHARGER) |

NOTIFICATION APPARATUS AND VEHICLE

CROSS REFERENCE TO RELATED APPLICATIONS

This application claims the benefit of priority of Japanese Patent Application No. 2023-033811 filed Mar. 6, 2023. The contents of this application are incorporated herein by reference in its entirety.

TECHNICAL FIELD

The present disclosure relates to a notification apparatus and a vehicle.

BACKGROUND ART

A known vehicle operates by using the power of a battery. In the case where such a vehicle is located in a low-temperature environment such as a cold region, there is a possibility that the performance of the battery declines. In some cases, a heater for heating a battery is provided in a vehicle in order to inhibit the performance of the battery from declining due to a low-temperature environment.

For example, PTL 1 discloses a structure that energizes a heater while the remaining capacity of a battery is detected after an ignition is turned off and that changes the state of the battery into a warm state.

CITATION LIST

Patent Literature

PTL 1
Japanese Patent Application Laid-Open No. 2005-295668

SUMMARY OF INVENTION

Technical Problem

However, since the heater is driven by using the power of the battery, there is a possibility caused by driving the heater that a reduction in the level of the battery makes the vehicle impossible to travel in the case where the level of the battery is low.

It is an object of the present disclosure to provide a notification apparatus and a vehicle that enable a reduction in the level of a battery to be inhibited from being caused by driving a heater.

Solution to Problem

A notification apparatus according to the present disclosure includes: a determination section that determines whether a position of a vehicle that includes a battery and a heater that heats the battery is in a low-temperature environment; and a notification section that sends a notification for encouraging charging of the battery depending on a result of determination of the determination section.

A vehicle according to the present disclosure includes: a battery; a heater that heats the battery in a low-temperature environment; a determination section that determines whether a position of the vehicle is in the low-temperature environment; and a notification section that sends a notification for encouraging charging of the battery depending on a result of determination of the determination section

Advantageous Effects of Invention

According to the present disclosure, a reduction in the level of a battery can be inhibited from being caused by driving a heater.

DESCRIPTION OF EMBODIMENTS

Embodiment 1

Figure 1:
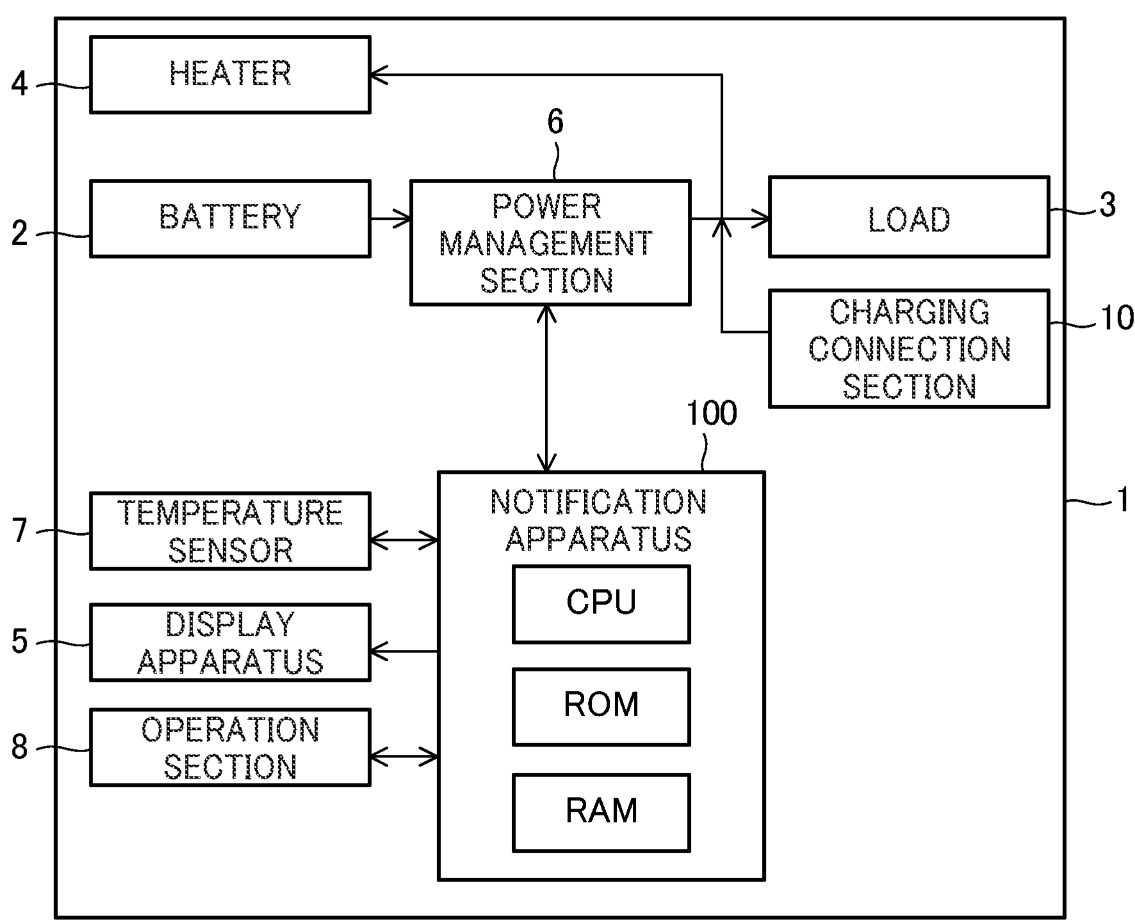
FIG. 1 illustrates a vehicle that includes a notification apparatus according to Embodiment of the present disclosure.
Figure 2:
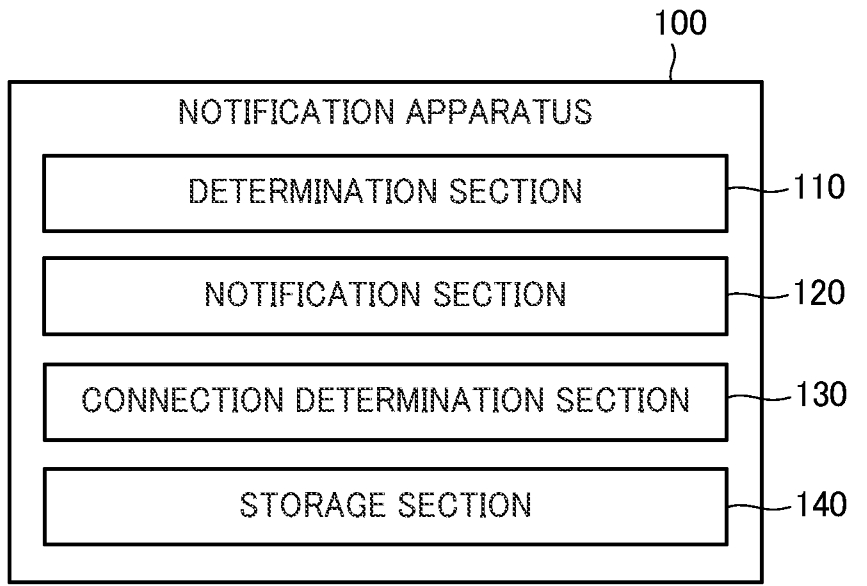
FIG. 2 illustrates a block diagram illustrating the notification apparatus according to the present Embodiment.

Embodiment of the present disclosure will now be described in detail with reference to the drawings. FIG. 1 illustrates vehicle 1 that includes notification apparatus 100 according to Embodiment of the present disclosure. FIG. 2 is a block diagram illustrating notification apparatus 100 according to the present Embodiment.

As illustrated in FIG. 1, vehicle 1 is a vehicle that is capable of traveling by using battery 2 such as a battery electric vehicle or a hybrid vehicle. Vehicle 1 has a function of encouraging a user to charge battery 2 in a low-temperature environment. Vehicle 1 includes load 3, heater 4, display apparatus 5, power management section 6, temperature sensor 7, operation section 8, and notification apparatus 100 in addition to battery 2. The low-temperature environment described herein is an environment in which temperature around vehicle 1 is currently or will be low temperature (for example, below freezing point). The low temperature described herein is not necessarily limited to below freezing point but is set depending on the characteristics of battery 2 of vehicle 1. The low temperature may be set as temperature at which the degree of degradation of battery 2 due to the temperature increases.

Load 3 is a section to which the power of battery 2 is supplied, and examples thereof include a drive apparatus for driving vehicle 1 and causing vehicle 1 to travel and vehicle equipment such as air-conditioning equipment.

An example of heater 4 is a known heating apparatus for heating battery 2, and heater 4 is operated in a manner in which the power is supplied thereto from battery 2. Heater 4 is disposed at a position at which heater 4 can heat battery 2 and may be configured so as to generate heat, for example, in the case where outside temperature becomes predetermined temperature. The predetermined temperature can be set to appropriate temperature, for example, in a range of 0° C.±5° C.

An example of display apparatus 5 may be a display apparatus such as a car navigation apparatus that is provided in vehicle 1.

Power management section 6 manages the power that is used by battery 2, and an example thereof may be an electronic control unit (ECU) that is provided in vehicle 1. Power management section 6 monitors information about electric energy that is used by battery 2 such as electric energy that is supplied from battery 2 to load 3 and electric energy that is supplied from battery 2 to heater 4. Power management section 6 calculates the level of battery 2, based on the electric energy that is used by battery 2 and outputs the level of battery 2 to notification apparatus 100.

Power management section 6 is capable of determining whether vehicle 1 is connected to a charge apparatus for charging battery 2. Specifically, power management section 6 is capable of monitoring charging connection section 10 of vehicle 1 and determining whether the power is supplied from the charge apparatus to battery 2 via charging connection section 10.

Temperature sensor 7 is a known temperature sensor that is capable of detecting the outside temperature around vehicle 1. Heater 4 described above may operate, for example, based on the result of detection of temperature sensor 7.

An example of operation section 8 is an ignition switch of vehicle 1. On-off operation of operation section 8 is performed, and this switches between supplying the power from battery 2 to load 3 and stopping supply.

Notification apparatus 100 includes a central processing unit (CPU), a read only memory (ROM), a random access memory (RAM), and an input-output circuit (not illustrated). Notification apparatus 100 sends a notification so as to encourage the user to charge battery 2 in the low-temperature environment. As illustrated in FIG. 2, notification apparatus 100 includes determination section 110, notification section 120, connection determination section 130, and storage section 140.

Determination section 110 determines whether the position of vehicle 1 is in the low-temperature environment. Specifically, for example in the case where off operation of operation section 8 is performed, and the supply of the power from battery 2 to load 3 is stopped, determination section 110 determines whether temperature that is detected by temperature sensor 7 is equal to or lower than the predetermined temperature described above.

Notification section 120 sends the notification for encouraging charging battery 2 depending on the result of determination of determination section 110. Specifically, in the case where the temperature that is detected by temperature sensor 7 is higher than the predetermined temperature, notification section 120 does not send the notification described above. In the case where the temperature that is detected by temperature sensor 7 is equal to or lower than the predetermined temperature, notification section 120 sends the notification described above.

An example of the notification for encouraging charging battery 2 may be literal information that can be displayed on display apparatus 5 for encouraging connecting battery 2 to the charge apparatus. The notification for encouraging charging battery 2 may be voice information for encouraging connecting battery 2 to the charge apparatus.

An example of the content of the notification may be a content enabling the user to recognize the low-temperature environment that causes the performance of battery 2 to decline and that causes heater 4 to operate.

Figure 3:
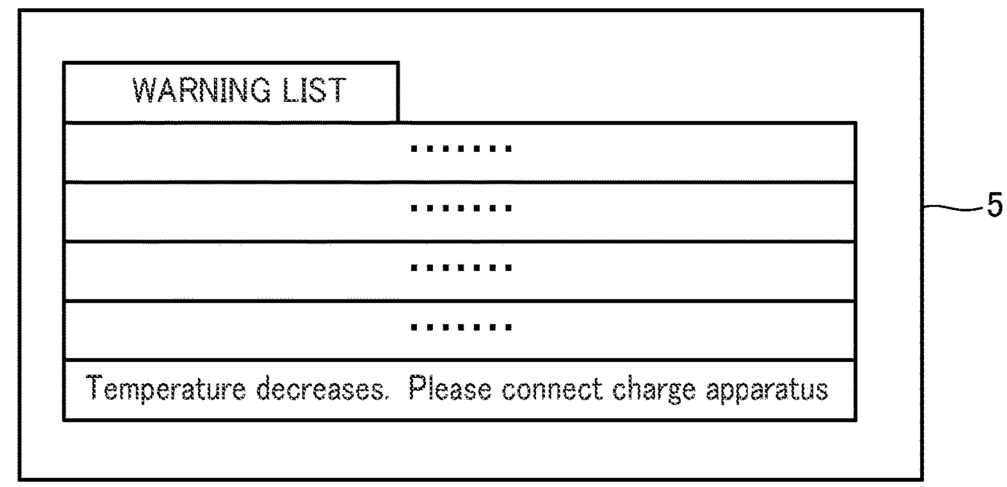
FIG. 3 illustrates an example of a notification that is sent by the notification section.

For example, FIG. 3 illustrates an example in which literal information that represents "Temperature decreases. Please connect charge apparatus" is displayed on display apparatus 5.

As for display apparatus 5, the notification described above may be freely displayed. As illustrated in, for example, FIG. 3, information about the notification described above may be displayed at a portion that needs to be checked by the user such as a "warning list".

In this way, the user is encouraged to connect battery 2 to the charge apparatus when vehicle 1 is stopped. As a result, the user can recognize the low-temperature environment and can recognize the necessity of charging battery 2. Accordingly, a reduction in the level of battery 2 can be inhibited from being caused by driving heater 4.

Notification section 120 may determine the level of the notification, based on information about the level of battery 2. Examples of the level of the notification may include a level that represents the degree of the necessity of charging and a level that represents the degree of urgency of charging.

For example, in the case where the level of battery 2 is less than a predetermined level, notification section 120 may send a notification that is more urgent than that in the case where the level of battery 2 is equal to or more than the predetermined level.

The predetermined level may be set to a freely determined level. For example, the predetermined level may be set to a level such that heater 4 is operated when vehicle 1 stops, and the level of battery 2 that consequently reduces is less than electric energy that is needed for vehicle 1 to travel. For example, in the case where the level is represented by the state of charge (SOC), the predetermined level may be set to about 5%.

Examples of an urgent notification may include a notification that is displayed such that characters are conspicuous more than that in the case where the level of battery 2 is equal to or more than the predetermined level and a notification that is sent such that a voice is louder than that in the case where the level of battery 2 is equal to or more than the predetermined level.

Connection determination section 130 determines whether the charge apparatus for charging battery 2 is connected to vehicle 1. Specifically, connection determination section 130 monitors whether the power is supplied from charging connection section 10 to which the charge apparatus is connected. In the case where the power is not supplied from charging connection section 10, connection determination section 130 determines that the charge apparatus is disconnected to vehicle 1. In the case where the power is supplied from charging connection section 10, connection determination section 130 determines that the charge apparatus is connected to vehicle 1.

In the case where connection determination section 130 determines that the charge apparatus is connected to vehicle 1, the power of battery 2 does not reduce, and heater 4 operates by using the power of the charge apparatus, and accordingly, notification section 120 does not send the notification described above regardless of whether vehicle 1 is located in the low-temperature environment.

In the case where connection determination section 130 determines that the charge apparatus is disconnected to vehicle 1, and vehicle 1 is located in the low-temperature environment, notification section 120 sends the notification described above.

This enables the notification to be sent only as necessary and accordingly enables the notification to be inhibited from being wastefully sent.

Storage section 140 may store the content of the notification that is sent by notification section 120.

Figure 4:
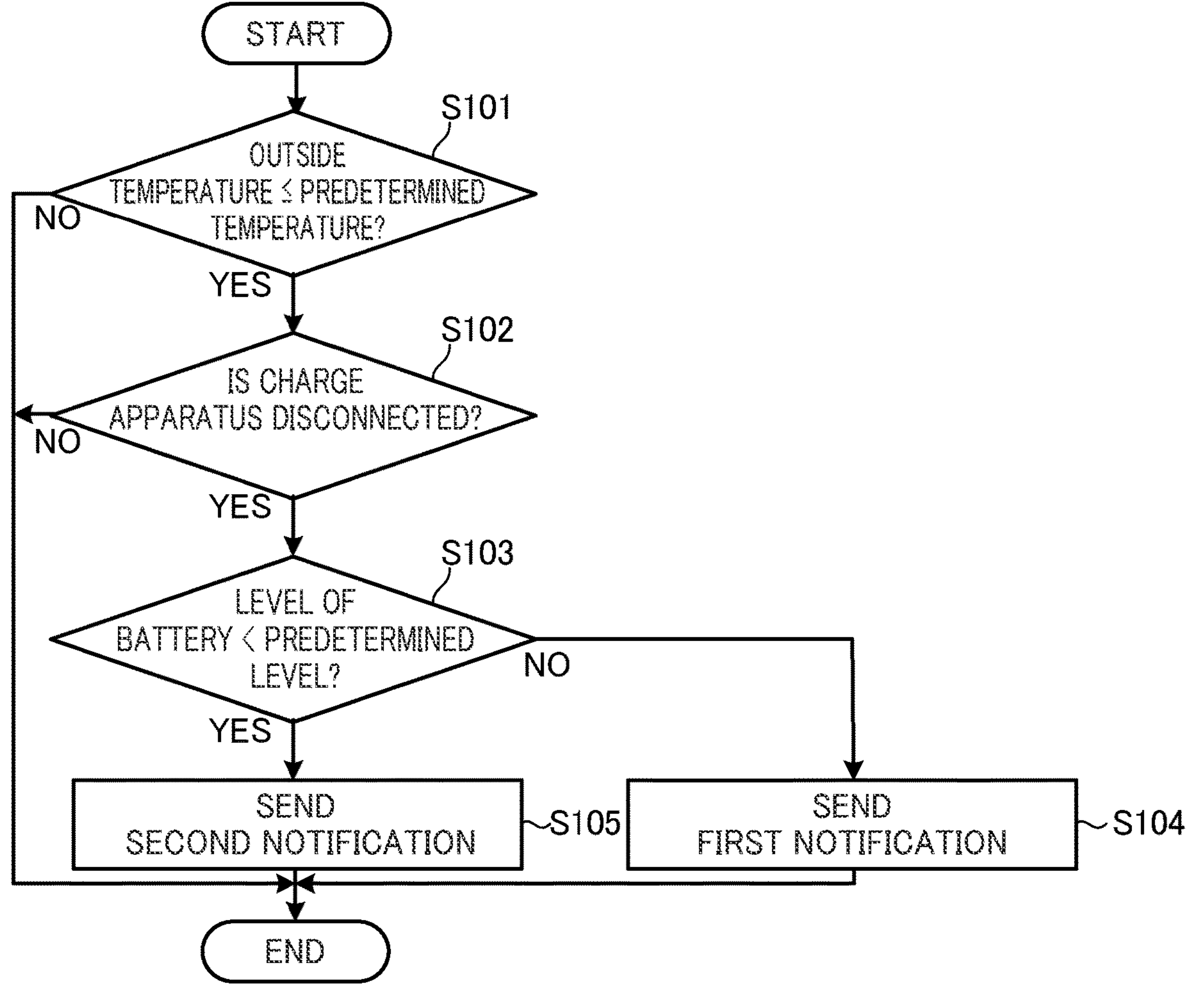
FIG. 4 is a flowchart illustrating an example of an operation for notification control regarding the notification apparatus.

An example of an operation for notification control regarding notification apparatus 100 thus configured will be described. FIG. 4 is a flowchart illustrating the example of the operation for notification control regarding notification apparatus 100. Processing in FIG. 4 is performed, for example, when operation section 8 of vehicle 1 stops the supply of the power from battery 2 to load 3.

As illustrated in FIG. 4, notification apparatus 100 acquires detection information from temperature sensor 7 and determines whether the outside temperature is equal to or lower than the predetermined temperature (step S101). In the case where the result of determination is that the outside temperature is higher than the predetermined temperature (NO at step S101), the control ends.

In the case where the outside temperature is equal to or lower than the predetermined temperature (YES at step S101), notification apparatus 100 acquires information about connection with charging connection section 10 and determines whether the charge apparatus is disconnected to vehicle 1 (step S102).

In the case where the result of determination is that the charge apparatus is connected (NO at step S102), the control ends. In the case where the charge apparatus is disconnected (YES at step S102), notification apparatus 100 acquires the level of battery 2 from power management section 6 and determines whether the level of battery 2 is less than the predetermined level (step S103).

In the case where the result of determination is that the level of battery 2 is equal to or more than the predetermined level (NO at step S103), notification apparatus 100 sends a first notification (step S104). In the case where the level of battery 2 is less than the predetermined level (YES at step S103), notification apparatus 100 sends a second notification (step S105). The second notification is more urgent than the first notification.

After step S104 or step S105, the control ends.

According to the present Embodiment thus configured, whether the position of vehicle 1 is in the low-temperature environment is determined, and the notification for encouraging charging battery 2 is sent depending on the result of determination.

As a result, the user can recognize the low-temperature environment and can recognize the necessity of charging battery 2. Accordingly, a reduction in the level of battery 2 can be inhibited from being caused by driving heater 4.

Determination section 110 determines whether the position of vehicle 1 is in the low-temperature environment, based on information about the outside temperature of vehicle 1. Accordingly, in the case where the position of vehicle 1 is in the low-temperature environment with certainty, the notification described above can be sent.

In the case where the charge apparatus is disconnected to vehicle 1, notification section 120 sends the notification described above. That is, in the case where the charge apparatus is connected to vehicle 1, the notification described above is not sent. In the case where the charge apparatus is connected to vehicle 1, the power is directly supplied from the charge apparatus to heater 4, and accordingly, heater 4 does not deprive battery 2 of the power. As a result, the notification can be sent only as necessary, and accordingly, the notification can be inhibited from being wastefully sent.

Notification section 120 determines the level of the notification, based on the information about the level of battery 2, and accordingly, the variety of the notification for encouraging charging that is sent to the user can be increased.

For example, in a more urgent case, increasing the urgency of the level of the notification enables the user to be likely to notice the notification.

According to Embodiment described above, whether the position of vehicle 1 is in the low-temperature environment is determined based on the information about the outside temperature of vehicle 1, but the present disclosure is not limited thereto. Determination section 110 may determine whether the position of vehicle 1 is in the low-temperature environment, for example, based on information about the position of vehicle 1, that is, whether the position of vehicle 1 is in a cold region.

Figure 5:
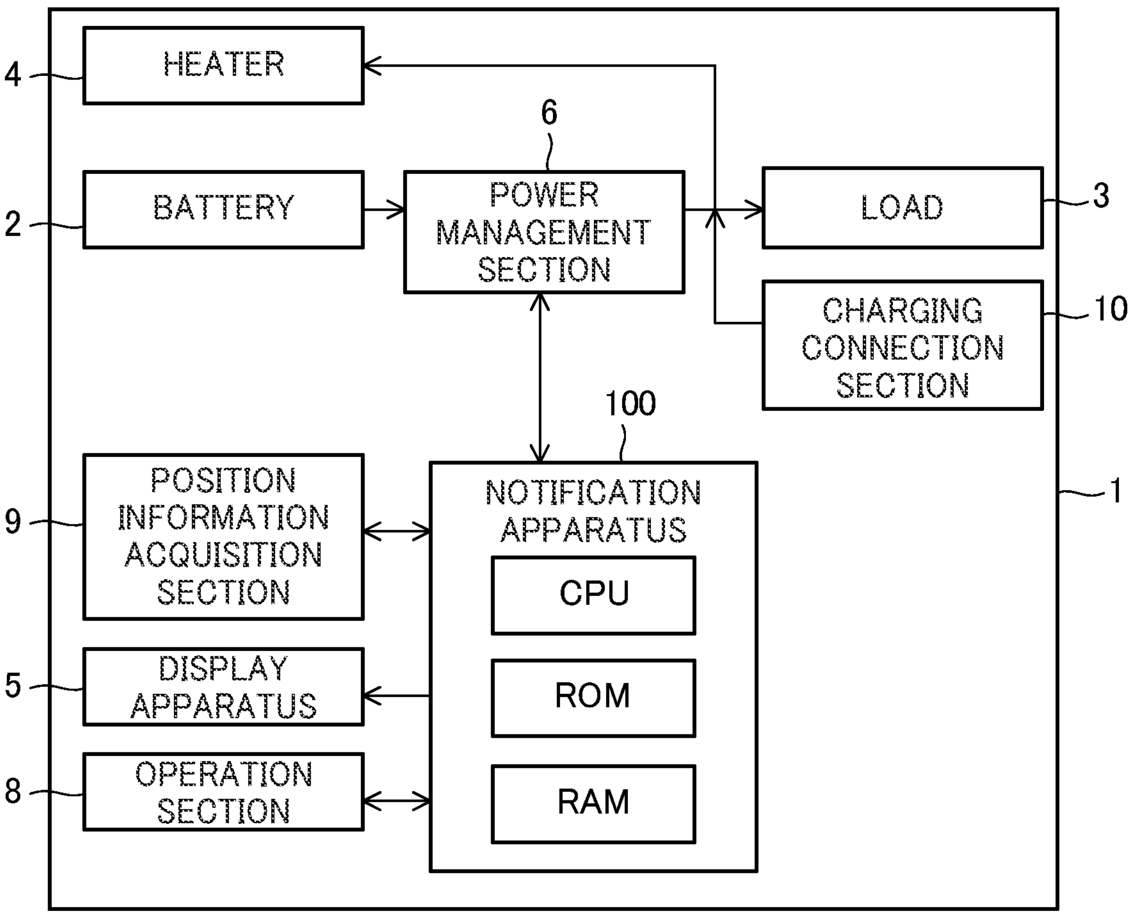
FIG. 5 illustrates a vehicle that includes a notification apparatus according to a modification.

Vehicle 1 with this structure includes a position information acquisition section 9 such as a global positioning system (GPS) sensor as illustrated in, for example, FIG. 5.

Determination section 110 acquires the information about the position of vehicle 1 from position information acquisition section 9 and determines whether the position of vehicle 1 is in the cold region. An example of the cold region may be a region in which temperature in the night is highly likely to be 0° C. or less during winter.

For example, in the case where vehicle 1 is located in region A that is registered as the cold region in storage section 140 in advance, determination section 110 recognizes that the position of vehicle 1 is in region A by using the information about the position from position information acquisition section 9. In this case, determination section 110 determines that position of vehicle 1 is in the cold region.

In the case where vehicle 1 is located in region B that is not registered as the cold region in storage section 140 in advance, determination section 110 recognizes that the position of vehicle 1 is in region B by using the information about the position from position information acquisition section 9. In this case, determination section 110 determines that the position of vehicle 1 is not in the cold region.

In the case where determination section 110 determines that the position of vehicle 1 is in the cold region, notification section 120 sends the notification for encouraging charging battery 2.

This enables the user to recognize the necessity of charging battery 2 by using the information about the position in the case where vehicle 1 is located in a region in which temperature is highly likely to reduce, and accordingly, a reduction in the level of battery 2 can be inhibited from being caused by driving heater 4.

Figure 6:
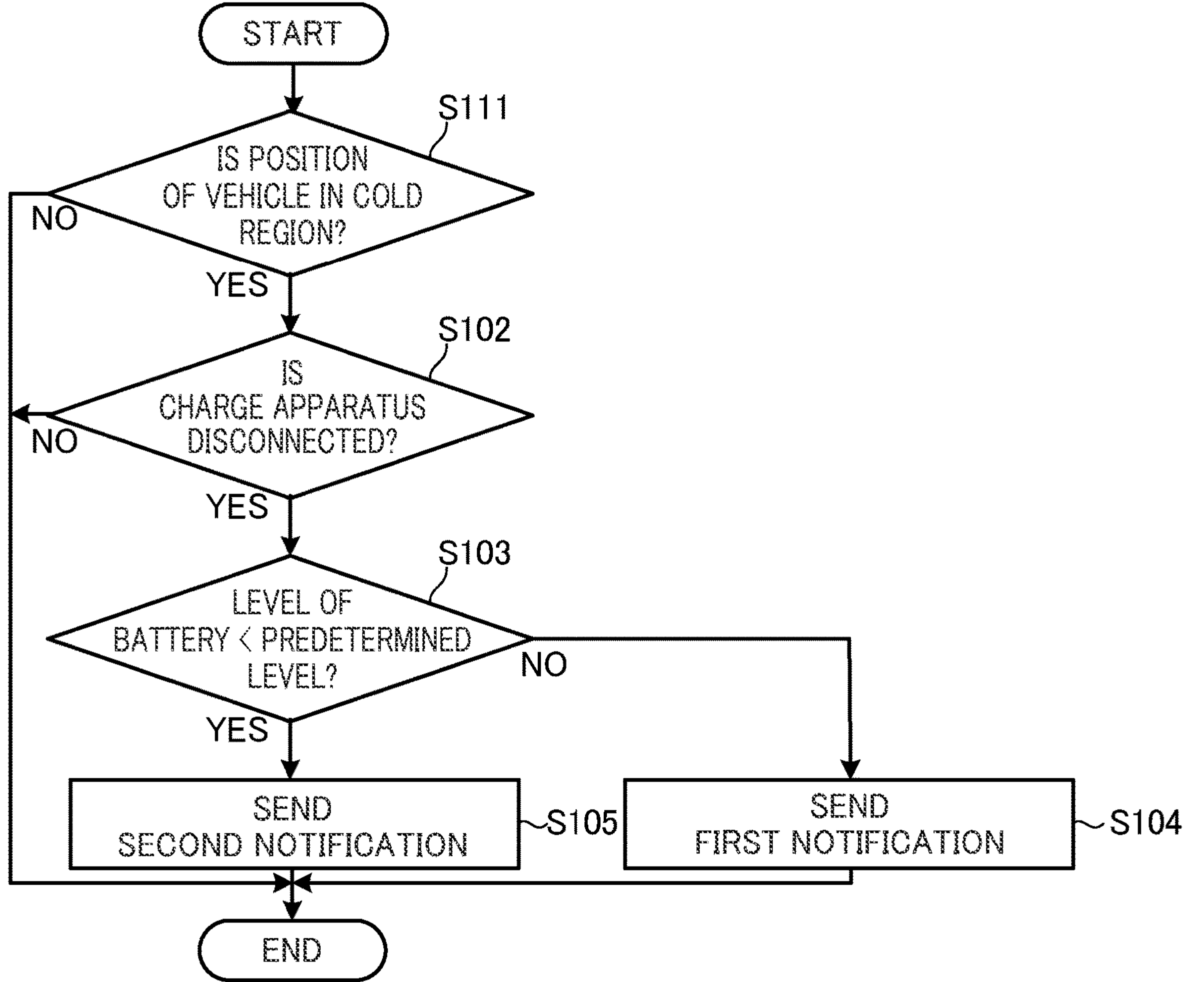
FIG. 6 is a flowchart illustrating an example of an operation for notification control regarding the notification apparatus according to the modification.

An example of the operation for notification control regarding notification apparatus 100 thus configured will be described. FIG. 6 is a flowchart illustrating the example of the operation for notification control regarding notification apparatus 100. Processing in FIG. 6 is performed, for example, by operation section 8 of vehicle 1 when the supply of the power from battery 2 to load 3 is stopped.

As illustrated in FIG. 6, notification apparatus 100 acquires information that is acquired by position information acquisition section 9 and determines whether the position of vehicle 1 is in the cold region (step S111). In the case where the result of determination is that the position of vehicle 1 is not in the cold region (NO at step S111), the control ends.

In the case where the position of vehicle 1 is in the cold region (YES at step S111), the flow of the processing proceeds to step S102. The flowchart illustrated in FIG. 6 is acquired by replacing step S101 in the flowchart in FIG. 4 with step S111. Processes after step S102 are the same as those in the flowchart illustrated in FIG. 4.

Also, with this structure, a reduction in the level of battery 2 can be inhibited from being caused by driving heater 4.

According to aspects illustrated in FIG. 5, in the case where vehicle 1 is located in the cold region, the notification is always sent. The present disclosure, however, is not limited thereto. For example, notification section 120 may determine whether the notification described above is to be sent, based on information from position information acquisition section 9 and information from temperature sensor 7 illustrated in FIG. 1.

According to Embodiment described above, the level of the notification is determined based on the information about the level of battery 2. The present disclosure, however, is not limited thereto. The level of the notification may be always constant. Notification section 120 may determine whether the notification is to be sent based on the information about the level of battery 2.

For example, notification section 120 may determine that no notification is to be sent in the case where the level of battery 2 is more than the predetermined level and may determine that the notification is to be sent in the case where the level of battery 2 is equal to or less than the predetermined level.

According to Embodiment described above, in the case where the outside temperature is lower than the predetermined temperature, or in the case where the position of vehicle 1 is in the cold region, the notification described above is sent. For example, even in some cases where temperature when vehicle 1 stops is equal to or higher than the predetermined temperature, the temperature after vehicle 1 stops greatly reduces depending on the weather. In this case, the temperature when vehicle 1 stops is used for determination, and accordingly, there is a possibility that the notification described above is not sent. Even in some cases where the position of vehicle 1 is in the cold region, the temperature is relatively high depending on the season. In this case, there is a possibility that the notification described above is sent although heater 4 does not operate.

For these reasons, notification section 120 may determine whether the notification is to be sent depending on the weather or the season.

For example, the weather may be based on information that is acquired from an external apparatus. The season may be based on information such as the current date.

For example, in the case where information that represents that the temperature will greatly reduce after the evening is acquired from an external apparatus, notification section 120 may determine that the notification is to be sent even when the temperature when vehicle 1 stops is equal to or higher than the predetermined temperature.

For example, in the case where the season is summer, notification section 120 may determine that no notification is to be sent even when the position of vehicle 1 is in the cold region.

According to Embodiment described above, the vehicle includes the notification apparatus. The present disclosure, however, is not limited thereto. For example, the notification apparatus may be an external apparatus (such as a server or a terminal apparatus) that is capable of communicating with the vehicle. In the case where the notification apparatus is an external apparatus, the notification section may transmit an instruction for sending the notification to the vehicle. The control apparatus of the vehicle that receives the instruction may display the notification based on the instruction on, for example, the display apparatus, based on the instruction. Data (such as the information about the position or information about temperature) that is acquired by the external apparatus from the vehicle may be acquired when vehicle 1 stops or in response to the instruction from the external apparatus.

According to Embodiment described above, the connection determination section is provided. The present disclosure, however, is not limited thereto. The connection determination section may not be provided.

Embodiment 2

A notification system according to Embodiment 2 of the present invention will be described with reference to FIG. 7, FIG. 8, FIG. 9, FIG. 10A, and FIG. 10B.

Figure 7:
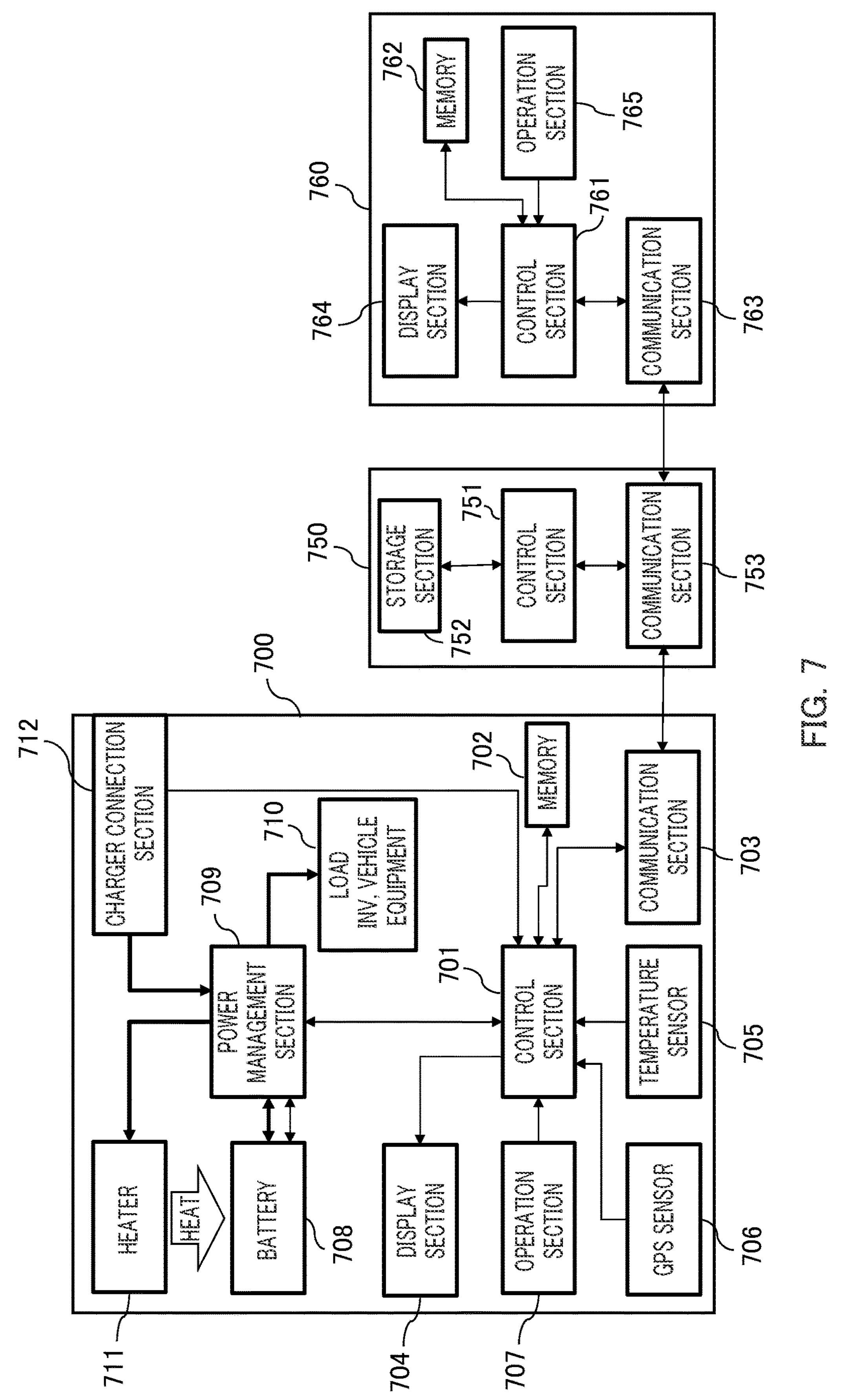
FIG. 7 schematically illustrates a functional block and the structure of a notification system according to Embodiment 2.

FIG. 7 schematically illustrates a functional block and the structure of the notification system according to Embodiment 2. The notification system includes vehicle 700, server 750, and terminal apparatus 760.

Vehicle 700 is an electric vehicle that is driven by using the power of battery 708. Server 750 is included in a management system that receives management information from vehicle 700, that stores the management information from vehicle 700 in storage section 752, and that manages vehicle 700. Terminal apparatus 760 is capable of accessing server 750, acquiring the management information from vehicle 700, and displaying the management information. Examples of terminal apparatus 760 include a personal computer, a tablet terminal, and a smart phone. In the description, the number of vehicle 700 is one. However, multiple vehicles may be capable of transmitting and receiving information to and from server 750.

Vehicle 700 includes control section 701, memory 702, communication section 703, display section 704, temperature sensor 705, GPS sensor 706, and operation section 707. Vehicle 700 further includes battery 708, power management section 709, load 710, heater 711, and charger connection section 712.

Control section 701 is one or more processors that are capable of running a program read from memory 702 and performing the function of control section 701 described later. Control section 701 is not limited to the one or more processors but may include one or more electronic circuits.

Memory 702 is a storage medium that stores a program for control section 701 to implement control described later and parameters for running the program.

Communication section 703 is a communication module that communicates with server 750. An example of a method of communication of communication section 703 with server 750 is wireless communication through the internet connection. The method of communication of communication section 703 with server 750 is not limited to the method described above but may be wired communication, a method of using satellite connection, or a method of using near field communication.

Display section 704 is a display apparatus that displays information depending on an instruction from control section 701. An example of display section 704 is an indication light that is provided on an instrument panel of vehicle 700. Display section 704 may be a display of an audio system or a car navigation system that is provided in vehicle 700.

Temperature sensor 705 is a detection section that measures the ambient temperature of vehicle 700. A method of measuring the temperature can use a known technique. Temperature sensor 705 outputs the result of detection to control section 701.

GPS sensor 706 is a positioning apparatus that acquires information about the position of vehicle 700. GPS sensor 706 acquires information about the longitude and latitude of a point at which vehicle 700 is located and outputs the information to control section 701.

Operation section 707 is an operation member for the user (driver) of vehicle 700 to operate vehicle 700. Operation section 707 is an ignition switch. The user presses down the ignition switch and consequently inputs an instruction for starting the operation of vehicle 700 and an instruction for stopping the operation thereof into control section 701.

Battery 708 is an electricity storage apparatus that supplies power for driving vehicle 700. Multiple batteries 708 may be provided. According to the present Embodiment, single battery 708 is provided.

Power management section 709 is a management module that controls the supply of the power to battery 708 and charging battery 708. Power management section 709 may include one or more processors and/or one or more electronic circuits. Power management section 709 controls the supply of the power and charging in response to an instruction from control section 701.

Load 710 is an electric load that operates by receiving the power of battery 708. Load 710 includes a motor or an inverter for causing vehicle 700 to travel. Load 710 includes vehicle equipment such as an air conditioner or a light.

Heater 711 is a heating apparatus for heating battery 708. An example of heater 711 is a heater wire that is wound around battery 708. Power management section 709 supplies the power to heater 711, battery 708 is consequently heated, and the temperature of battery 708 is inhibited from reducing.

Charger connection section 712 is a connection terminal section that is connected to an external charge apparatus for charging battery 708. Charger connection section 712 includes a determination circuit that determines whether the charge apparatus is connected and transmits, to control section 701, the result of determination that represents whether the charge apparatus is connected. Battery 708 is charged by using the power that is supplied from the charge apparatus that is connected to charger connection section 712.

Server 750 is a server computer that is included in the management system that is capable of acquiring the management information from vehicle 700 and managing (monitoring) the state of vehicle 700. Server 750 includes control section 751, storage section 752, and communication section 753.

Control section 751 is one or more processors that are capable of running a program read from memory 702 and performing the function of control section 751. Control section 751 is not limited to the one or more processors but may include one or more electronic circuits.

Storage section 752 is a storage medium that stores a program for control section 751 to implement control described later and parameters for running the program. Storage section 752 stores and retains the management information that is acquired from vehicle 700.

Communication section 753 is a communication module that communicates with vehicle 700 and terminal apparatus 760. An example of a method of communication of communication section 753 with vehicle 700 and terminal apparatus 760 is wireless communication through the internet connection. The method of communication of communication section 753 with vehicle 700 and terminal apparatus 760 is not limited to the method described above but may be wired communication, a method of using satellite connection, or a method of using near field communication.

Terminal apparatus 760 is capable of accessing server 750, acquiring information about vehicles including vehicle 700 to be managed, and providing the information to an administrator.

Control section 761 is one or more processors that are capable of running a program read from memory 762 and performing the function of control section 761 described later. Control section 761 is not limited to the one or more processors but may be one or more electronic circuits.

Memory 762 is a storage medium that stores a program for control section 761 to implement control described later and parameters for running the program.

Communication section 763 is a communication module for communicating with server 750. An example of a method of communication of communication section 763 with server 750 is wireless communication through the internet connection. The method of communication of communication section 763 with server 750 is not limited to the method described above but may be wired communication, a method of using satellite connection, or a method of using near field communication.

Display section 764 causes display apparatus 770 to display information in response to an instruction from control section 761. Display apparatus 770 is a display that is provided outside the terminal apparatus. Terminal apparatus 760 may include display apparatus 770 as in a tablet terminal.

Figure 8:
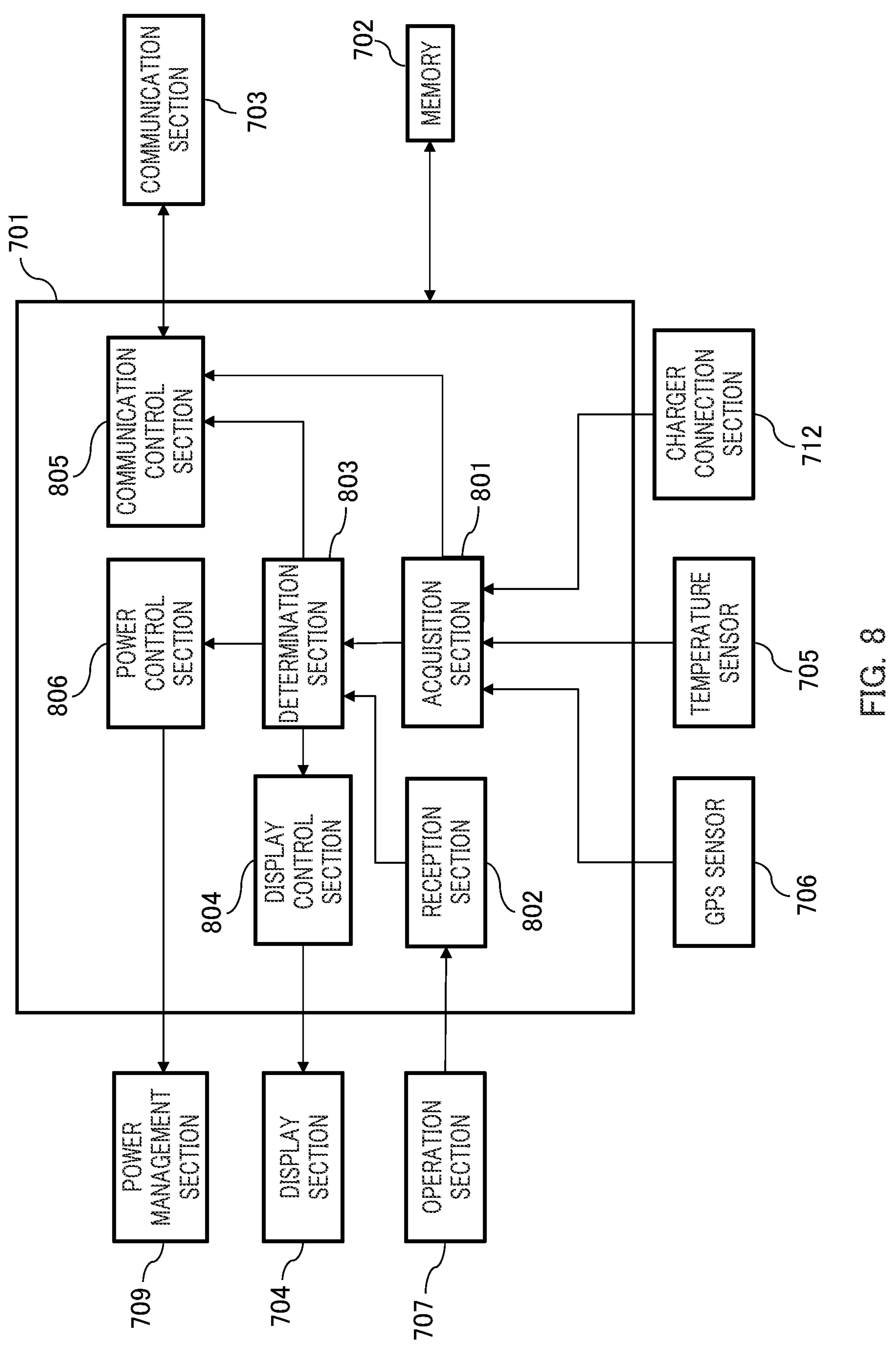
FIG. 8 is a functional block diagram illustrating a function of a control section of a vehicle.

FIG. 8 is a functional block diagram illustrating a function of control section 701 of vehicle 700.

Control section 701 includes acquisition section 801, reception section 802, determination section 803, display control section 804, communication control section 805, and power control section 806.

Acquisition section 801 acquires information that is outputted from temperature sensor 705, GPS sensor 706, and charging connection section 712. Acquisition section 801 outputs the acquired information to determination section 803.

Reception section 802 receives an instruction depending on the operation of operation section 707. In the case where operation section 707 is an ignition switch, reception section 802 receives an instruction for stopping the vehicle or starting the operation thereof in response to the operation of operation section 707. Reception section 802 outputs the instruction that is received by reception section 802 to determination section 803.

Determination section 803 determines whether vehicle 700 is located in the low-temperature environment, based on the information that is inputted from acquisition section 801 and reception section 802. The low-temperature environment described herein is an environment in which temperature around vehicle 700 is currently or will be low temperature (for example, below freezing point). The low temperature described herein is not necessarily limited to below freezing point but is set depending on the characteristics of battery 708 of vehicle 700. The low temperature may be set as temperature at which the degree of degradation of battery 708 due to the temperature increases.

Determination section 803 may determine whether vehicle 700 is located in the low-temperature environment by using the information about the position of vehicle 700 that is acquired from GPS sensor 706 and map data that is read from memory 702. The map data contains the information about the position and the lowest temperature at the position that are associated with each other. In the case where the lowest temperature in the acquired information about the position is equal to or less than a threshold, determination section 803 determines that vehicle 700 is located in the low-temperature environment. The map data may be associated with the lowest temperature depending on the season, date, or month. In this case, determination section 803 may determine whether vehicle 700 is located in the low-temperature environment by using information that represents time and date that are acquired from a timer not illustrated.

In the case where the temperature of vehicle 700 that is acquired from temperature sensor 705 is equal to or less than a threshold, determination section 803 determines that vehicle 700 is located in the low-temperature environment.

In the case where it is determined that vehicle 700 is located in the low-temperature environment, determination section 803 transmits information that represents that vehicle 700 is located in the low-temperature environment to server 750 via communication control section 805.

Determination section 803 determines whether a predetermined notification is to be sent depending on information that is inputted from charger connection section 712 and that represents whether the charge apparatus is connected and the level of battery 708. In the case where it is determined that the notification is to be sent, determination section 803 outputs an instruction for sending the notification to display control section 804 and communication control section 805.

Display control section 804 is a notification section that sends the notification to display section 704 in response to the instruction from determination section 803. The function of the notification section can include displaying an image described later and sending a voice notification.

Communication control section 805 transmits and receives information to and from server 750 via communication section 703. Communication control section 805 transmits information that represents that it is determined that vehicle 700 is located in the low-temperature environment and information (the instruction) that represents that the predetermined notification is to be sent to server 750. Communication control section 805 can also transmit the information that is acquired by acquisition section 801 to server 750.

Power control section 806 acquires the level of battery 708 via power management section 709 and outputs the level of battery 708 to determination section 803. Power control section 806 outputs the power that is inputted from the charge apparatus to heater 711 and causes battery 708 to be heated in response to the instruction from determination section 803.

Figure 9:
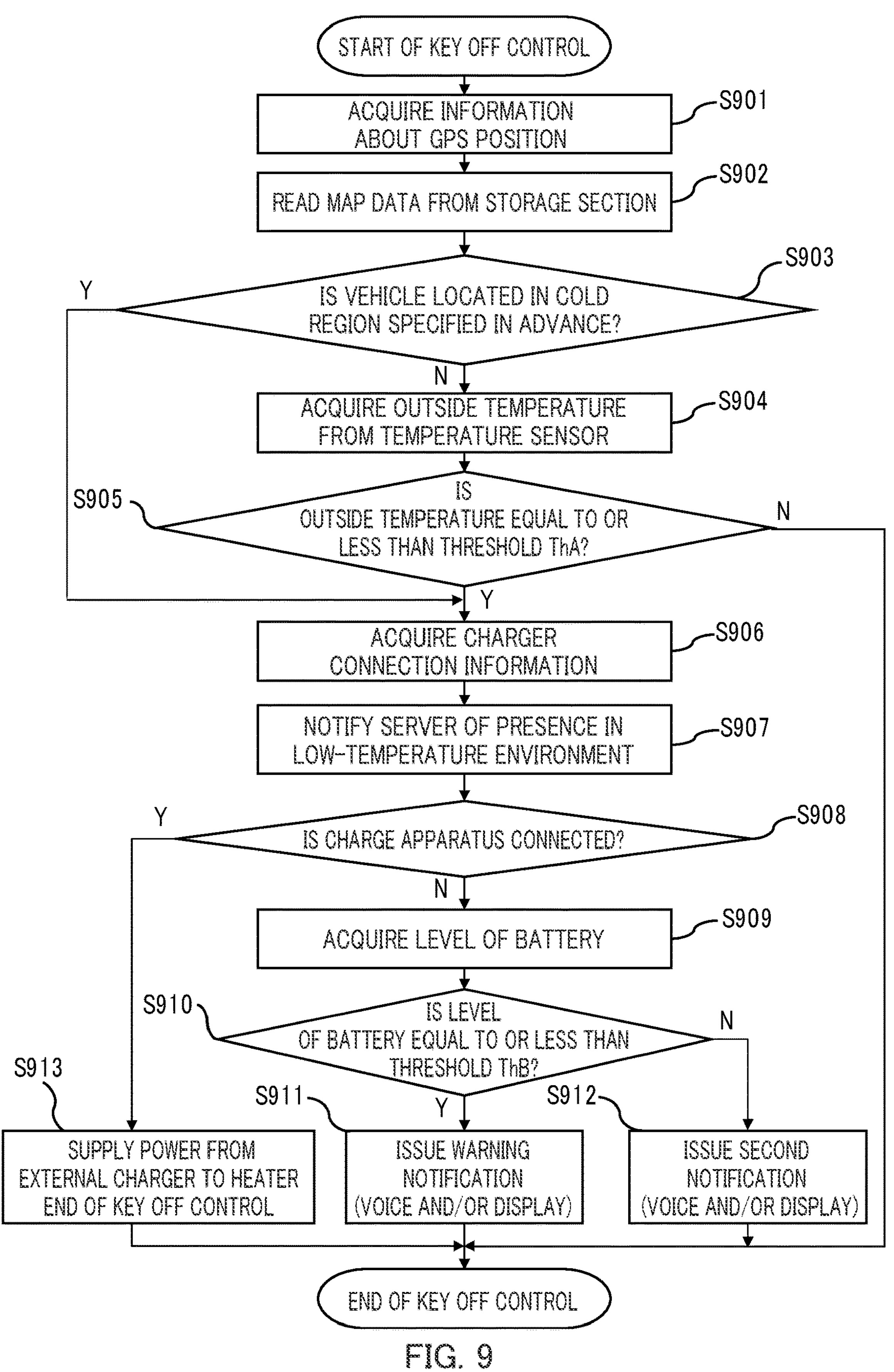
FIG. 9 is a flowchart for describing a control flow according to Embodiment 2.

FIG. 9 is a flowchart for describing a control flow according to the present Embodiment. Processing in the flowchart is performed in response to the input of the instruction for stopping vehicle 700 into reception section 802 via operation section 707.

At S901, acquisition section 801 acquires the information about the position of vehicle 700 from GPS sensor 706. Acquisition section 801 outputs the information about the position to determination section 803.

At S902, acquisition section 801 reads the map data from memory 702. Acquisition section 801 outputs the map data to determination section 803.

At S903, determination section 803 determines whether vehicle 700 is located in the low-temperature environment. In the case where it is determined that vehicle 700 is located in the low-temperature environment (Yes at S903), the flow of the processing proceeds to S906. In the case where it is determined that vehicle 700 is not located in the low-temperature environment (No at S903), the flow of the processing proceeds to S904.

At S904, acquisition section 801 acquires the result of detection that represents the ambient temperature of vehicle 700 (the outside temperature) from temperature sensor 705. Acquisition section 801 outputs the result of detection about the temperature to determination section 803.

At S905, determination section 803 determines whether the outside temperature is equal to or less than threshold ThA. In the case where the outside temperature is more than threshold ThA (No at S905), it is determined that vehicle 700 is not in the low-temperature environment, and the flow ends. In the case where the outside temperature is equal to or less than threshold ThA (Yes at S905), the flow of the processing proceeds to S906.

The flow of the processing proceeding to S906 means that vehicle 700 is located in the low-temperature environment, and there is a possibility that battery 708 is degraded due to low temperature.

At S906, acquisition section 801 acquires information (charger connection information) that represents whether vehicle 700 is connected to the charge apparatus from charger connection section 712. Acquisition section 801 outputs the charger connection information to determination section 803.

At S907, determination section 803 instructs communication control section 805 to notify server 750 of the information that represents that vehicle 700 is located in the low-temperature environment via communication section 703. In the case where the information that represents that vehicle 700 is located in the low-temperature environment is received via communication section 753, control section 751 of server 750 stores a combination of information for identifying vehicle 700 and a time at which the information is received in storage section 752. This enables the management system to recognize that vehicle 700 is located in the low-temperature environment and enables information about the history thereof to be managed.

At S908, determination section 803 determines whether vehicle 700 is connected to the external charge apparatus, based on the charger connection information. In the case where vehicle 700 is connected to the external charge apparatus (Yes at S908), the flow of the processing proceeds to S913. In the case where vehicle 700 is disconnected to the external charge apparatus (No at S908), the flow of the processing proceeds to S909.

At S909, determination section 803 acquires the level of battery 708 from power control section 806. Acquisition section 801 may acquire the level of battery 708 from power control section 806. In this case, acquisition section 801 outputs information that represents the level of battery 708 to determination section 803.

At S910, determination section 803 determines whether the level of battery 708 is equal to or less than threshold ThB. In the case where it is determined that the level of battery 708 is equal to or less than threshold ThB (Yes at S910), the flow of the processing proceeds to S911. In the case where it is determined that the level of battery 708 is more than threshold ThB (No at S910), the flow of the processing proceeds to S912.

At S911, determination section 803 outputs information to display control section 804 and communication control section 805 such that a first notification is to be sent. In a state at S911, vehicle 700 is located in the low-temperature environment, and the level of battery 708 is low. Accordingly, this state can be said as a state in which there is a concern that battery 708 is degraded in the low-temperature environment, or driving heater 711 by using the power of battery 708 results in a further reduction in the level of battery 708, and consequently, next travel is negatively affected. Accordingly, it is necessary for the driver or the administrator to be firmly warned and requested to take a countermeasure.

Figures 10A, 10B:
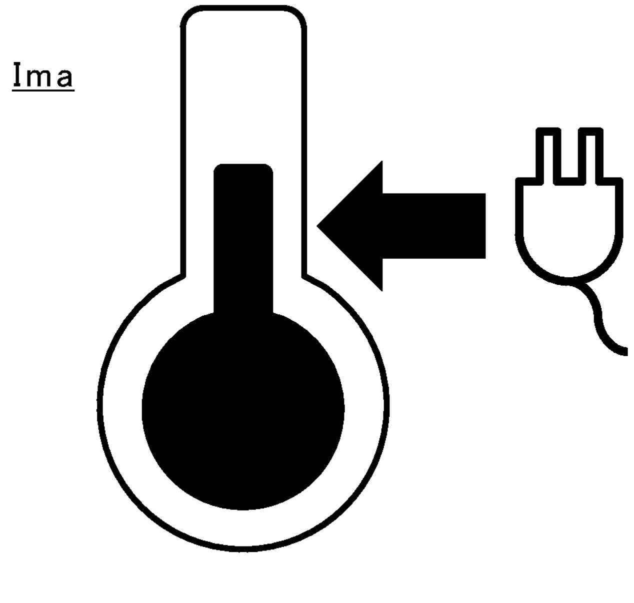
FIG. 10A schematically illustrates an example of an image that is displayed on a display section for notification.
FIG. 10B schematically illustrates management information that is displayed on a terminal apparatus.

Display control section 804 sends the predetermined notification to display section 704 in response to the reception of the instruction for sending the first notification. The notification that is sent by display control section 804 described herein depending on the first notification is a notification for displaying a blinking image and outputting a predetermined voice by using a generation section not illustrated. FIG. 10A schematically illustrates an example of image Ima that is displayed on display section 704 for the notification. Display control section 804 causes display section 704 to display image Ima that blinks in response to the reception of the instruction for sending the first notification.

Server 750 outputs an instruction for sending a push warning notification to the terminal apparatus in response to the reception of the instruction for sending the first notification. For example, a command is transmitted to terminal apparatus 760 via communication section 753 such that an alert image is forcefully displayed on terminal apparatus 760. Terminal apparatus 760 displays the alert image on a screen in response to the input of the instruction. A method of displaying the alert image is not limited. The notification may be sent to a terminal of the administrator by using a message function or email.

At S912, determination section 803 outputs information to display control section 804 and communication control section 805 such that a second notification is to be sent. In a state at S912, vehicle 700 is located in the low-temperature environment, and the level of battery 708 can be held at a certain level or more. Accordingly, it can be said that a concern about the next travel is not serious (unlike the case of S911) even when battery 708 is degraded in the low-temperature environment, or heater 711 is driven by using the power of battery 708. Accordingly, at S912, the second notification the warning degree of which is lower than that of the first notification is sent.

Display control section 804 sends the predetermined notification to display section 704 in response to the reception of the instruction for sending the second notification. The notification that is sent by display control section 804 described herein depending on the second notification is a notification for displaying image Ima or outputting a voice by using the generation section not illustrated.

Server 750 transmits an instruction for displaying warning information to terminal apparatus 760 in response to the reception of the instruction for sending the second notification. A push notification is not forcefully displayed unlike the first notification, but predetermined information may be displayed in response to access from the administrator. FIG. 10B schematically illustrates the management information that is displayed on terminal apparatus 760. At this time, the information that represents that vehicle 700 is located in the low-temperature environment is displayed in the bottom row of the information. Terminal apparatus 760 may send the notification to the terminal of the administrator by using a message function or email in response to the input of the instruction.

The kinds of the notifications at S911 and S912 differ from each other, and this enables the driver or the administrator to easily judge whether the situation of vehicle 700 is urgent.

At S913, determination section 803 controls the output of an instruction to power control section 806 such that the power that is inputted from the external charge apparatus is partly or entirely used, and the power is supplied to heater 711. Power control section 806 receives the instruction and controls power management section 709 such that the power that is inputted from the external charge apparatus via charger connection section 712 is supplied to heater 711. This enables the temperature of battery 708 to be inhibited from reducing without using the power of battery 708 and enables battery 708 to be inhibited from being degraded even in the low-temperature environment. S911, S912, and S913 end, and the flow ends.

In the case where the outside temperature that is acquired by temperature sensor 705 is equal to or less than threshold ThA after the flow ends, power control section 806 supplies the power of battery 708 to heater 711 and inhibits battery 708 from having low temperature.

The control that is implemented as described above enables a notification to be sent to the driver in advance in the case where it is presumed that vehicle 700 stops and is currently located and will be located in the low-temperature environment. The driver or the administrator receives the notification and can take a countermeasure, for example, the external charge apparatus is connected, or vehicle 700 is moved to a location that is not in the low-temperature environment. When the notification is sent also to the administrator who manages vehicle 700, the administrator contacts the driver and can request for a countermeasure for inhibiting battery 708 from being degraded. Storing the information that represents that vehicle 700 has been located in the low-temperature environment in the storage section of server 750 enables the cause of the degradation of battery 708 of vehicle 700 to be more accurately identified.

According to Embodiment 2, determination section 803 of control section 701 of vehicle 700 determines whether vehicle 700 is located in the low-temperature environment and whether a notification is to be sent. However, the determination may be made by control section 751 of server 750. The information that is acquired by acquisition section 801 and power control section 806 of vehicle 700 may be stored in storage section 752 of server 750 via communication section 703, and control section 751 may perform the processing of determination section 803. In this case, the result of determination is transmitted from control section 751 to vehicle 700, and this enables a notification to be sent and power control to be implemented regarding vehicle 700.

As for the description for the flowchart illustrated in FIG. 9, a timing with which acquisition section 801 acquires the information is not limited by the example described above. Acquisition section 801 may acquire the entire information in advance, and determination section 803 may make the determination. The same is true for the information that represents the level of battery 708 that is acquired by power control section 806.

Embodiments are described above as specific examples for carrying out the present disclosure and must not let the technical scope of the present disclosure be restrictively interpreted. That is, the present disclosure can be carried out in various forms without departing from the spirit thereof or the main characteristics thereof.

This application is entitled to and claims the benefit of Japanese Patent Application No. 2023-033811, filed on Mar.

6, 2023, the disclosure of which including the specification, drawings and abstract is incorporated herein by reference in its entirety.

INDUSTRIAL APPLICABILITY

A notification apparatus according to the present disclosure is useful for a notification apparatus and a vehicle that enable a reduction in the level of a battery to be inhibited from being caused by driving a heater.

The invention claimed is:

1. A notification apparatus, comprising:

a determination section that determines whether a position of a vehicle that includes a battery and a heater that heats the battery is in a low-temperature environment, based on information about temperature outside the vehicle and information about the position of the vehicle; and a notification section that sends a notification for encouraging charging of the battery depending on a result of determination of the determination section, wherein the determination section determines whether the information about the position of the vehicle is in a cold region registered in advance, based on the information about position of the vehicle, in a case determined where the information about the position of the vehicle is not in the cold region registered in advance, the determination section determines whether the position of the vehicle is in the low-temperature environment, based on information about temperature outside the vehicle, in a case determined where the position of the vehicle is in the low-temperature environment, the determination section determines whether a level of the battery is equal or less than a threshold, in a case determined where the information about the position of the vehicle is in the cold region, the determination section determines whether the level of the battery is equal or less than the threshold without performing determination based on the information about temperature outside the vehicle, in a case where the level of the battery is equal to or less than the threshold, the notification section sends a first battery level notification, and in a case where the level of the battery is not equal to or less than the threshold, the notification section sends a second battery level notification that is lower warning degree than the first battery level notification.

2. The notification apparatus according to claim 1, further comprising:

a connection determination section that determines whether a charge apparatus for charging the battery is connected to the vehicle, wherein the notification section sends the notification in a case where the connection determination section determines that the charge apparatus is not connected to the vehicle.

3. A vehicle comprising:

a battery;

a heater that heats the battery in a low-temperature environment;

a determination section that determines whether a position of the vehicle is in the low-temperature environment, based on information about temperature outside the vehicle and information about the position of the vehicle; and a notification section that sends a notification for encouraging charging of the battery depending on a result of determination of the determination section, wherein the determination section determines whether the information about the position of the vehicle is in a cold region registered in advance, based on the information about position of the vehicle, in a case determined where the information about the position of the vehicle is not in the cold region registered in advance, the determination section determines whether the position of the vehicle is in the low-temperature environment, based on information about temperature outside the vehicle, in a case determined where the position of the vehicle is in the low-temperature environment, the determination section determines whether a level of the battery is equal or less than a threshold, in a case determined where the information about the position of the vehicle is in the cold region, the determination section determines whether the level of the battery is equal or less than the threshold without performing determination based on the information about temperature outside the vehicle, in a case where the level of the battery is equal to or less than the threshold, the notification section sends a first battery level notification, and in a case where the level of the battery is not equal to or less than the threshold, the notification section sends a second battery level notification that is lower warning degree than the first battery level notification.

* * * * *